Patented July 27, 1943

2,325,071

UNITED STATES PATENT OFFICE 2,325,071

BEARING AND LIKE ARTICLE

William S. Murray, Utica, N. Y., assignor to Indium Corporation of America, a corporation of New York No Drawing. Application November 30, 1940, Serial No. 368,041

6 Claims. (Cl. 308—237)

This invention relates to bearings and like articles having surfaces subjected to wear, particularly articles of such nature which are lubricated to minimize the effects of wear.

For many years bearings for internal combustion engines and for other purposes have been made with a bearing surface composed of lead, or, more commonly, of a lead alloy. In modern high compression engines and in other modern uses, such bearings have been found to be lacking in desirable properties. For example, the fatigue resistance of many lead-base bearings is relatively low, and such bearing surfaces moreover are subject to corrosion by acids and other corrosive compounds present or formed in lubricating oils and greases.

Recently bearings for aircraft and other high-powered internal combustion engines have been made by electroplating a thin film of indium on a lead-base bearing surface, and subsequently heating the thus plated bearing to diffuse the indium into the lead-base bearing surface. In this manner bearings having excellent resistance to fatigue failure and to corrosion have been produced. The procedure for thus making bearings is, however, rather complicated for commercial use. The bearing must be carefully cleaned before plating with indium, the indium plating operation itself must be carefully controlled, the bearing must be masked so as to avoid plating indium on parts where it is not desired, and the diffusion step must be carried out carefully to insure adequate and effective penetration of the indium into the lead-base bearing. In the finished bearing made in this manner, the indium is concentrated close to the bearing surface. With a new bearing this is not objectionable, but if the bearing is subjected to service under such conditions or for so long a time as to become worn appreciably, most of the indium is lost and the remaining lead-base bearing surface is inadequately resistant to corrosion and fatigue to function as it should in the environment for which it was originally designed.

The present invention provides an improved bearing or like article having a surface adapted to be subjected to wear as well as to mechanical stresses and to corrosive conditions. The article of the invention comprises a supporting member having thereon a surface layer comprised of finely divided lead-indium particles consisting essentially of lead and indium, such, for example, as finely divided particles of an alloy consisting essentially of lead and indium. The lead-indium particles in this surface layer are bonded together to form an integral surface layer adherent to the supporting member. The lead-indium particles may be in the form of particles of lead coated with indium, but in general, particles of a true lead-indium alloy may be procured more conveniently.

The amount of indium present should be in the range of 0.05% to 10% by weight of the alloy (or by weight of the indium-coated particles) in order to secure most satisfactory results. Within this range particularly satisfactory results may be achieved by employing finely divided particles of a lead-indium alloy containing 0.2% to 1% by weight of indium. The surface layer of the article thus produced is highly resistant to fatigue and to corrosion by acidic and similar corrosive substances. Inasmuch as the indium is uniformly distributed throughout the bearing surface layer, wear of the bearing surface does not affect the ability of the surface layer to resist corrosion and fatigue failure.

In manufacturing the article of the invention, a relatively thin surface layer comprising finely divided indium-lead particles is applied to a supporting member such as a backing sheet. This layer on the supporting structure is then heated, preferably in a non-oxidizing or reducing atmosphere, to an elevated temperature in such manner as to cause the lead-indium particles to bond together and to form a layer adherent to the supporting member. The layer on the supporting member also is subjected to an elevated pressure in such manner as to produce a dense, compact surface layer of the bonded indium-lead particles.

Although the article of the invention may be in the form of any article having a surface intended to be subjected to wear, mechanical stress, and corrosion, such as printing type or plates, guide rods or other guide members, and the like, the invention is of particular utility in the field of bearings and is described below in detail with particular reference to a bearing structure.

The supporting member or sheet may be in whatever form is required by the completed article. In the case of a bearing the supporting member ordinarily is in the form of a flat sheet or strip of steel, which, after application of the bearing surface layer, may be formed into a conventional half bearing or other bearing element.

A relatively thin layer of finely divided lead-indium particles is spread on a surface of the steel sheet or other supporting member in such manner as to form an even layer of substantially uniform thickness. The most convenient and satisfactory lead-indium material for this surface layer is a lead-indium alloy powder. The powder may be made in any known manner, as by atomizing the molten alloy by mechanical means in a non-oxidizing atmosphere. Other methods for preparing a powder of the alloy also are known and may be employed in its production. If desired, however, the finely divided particles may be in the form of particles of lead powder which have been coated with a thin film of indium. Particles of lead coated with indium of course are not in the form of a true alloy of lead and indium, but may be employed fully as satisfactorily as the powdered alloy for the purposes of the invention. In referring to "lead-indium particles" in this specification, I intend to include within the scope of that term both finely divided particles of a true lead-indium alloy and finely divided particles of lead having a surface coating of indium.

The amount of indium present in the lead-indium particles should be about 0.05% to about 10% by weight of the particles, the balance of the particles being lead. Within this range highly satisfactory results have been obtained employing 0.2% to 1% by weight of indium. Such an amount of indium materially enhances the resistance of the finished bearing surface layer of the article both to fatigue failure and to corrosion.

Although the invention does not specifically contemplate the inclusion of other ingredients in the surface layer of lead-indium powder, such ingredients are not excluded. A considerable number of other metals in powdered form may be mixed with the lead-indium powder without materially affecting the fatigue resistance or the corrosion resistance of the material when applied as a surface layer to a supporting member or backing sheet in accordance with the invention. Cadmium, copper, silver, or tin powders, or mixtures of them, may be admixed with the lead-indium powder. The inclusion of such metals may increase the hardness of the finished surface layer or otherwise enhance the value of the powder mixture for the purpose intended. For example, the inclusion of a proportion of copper powder with the lead-indium powder hardens and strengthens the surface layer formed from the powder mixture, but so far as fatigue resistance and resistance to corrosion of the surface layer as a whole is concerned, the copper powder appears to have little or no effect. It appears that the lead is the constituent which renders the surface layer particularly subject to fatigue failure and to damage due to corrosion. Hence the amount of indium which should be present in association with the lead is substantially unaffected by the presence or absence of such other metals as copper. The proportion of indium stated above applies, therefore, only to the lead-indium content of the surface layer and not to the surface layer as a whole if it includes other added metals.

Having prepared or otherwise procured the mixture of lead and indium powders as described above, the mixture is applied in the form of a thin layer to the surface of the metal sheet or other supporting member. This may be accomplished in any suitable known manner. For example, the powder mixture may be spread over the surface of the sheet, and excess powder may then be removed by passing the sheet under a suitably arranged blade to form a thin powder layer of uniform thickness on the sheet. Ordinarily only a relatively thin layer of the metal powder mixture, one tenth of an inch or less in thickness, is required to provide an adequate bearing surface layer.

The steel backing sheet or other supporting member with the layer of lead-indium powder thereon is heated to an elevated temperature sufficient to cause the powdered particles to bond together and to form an adherent layer on the backing sheet. This heating operation should be conducted in a furnace in which a non-oxidizing or reducing atmosphere is maintained. A non-oxidizing or reducing atmosphere is important because of the marked susceptibility of indium, and, to a lesser extent, of lead, to oxidation. If the heating is carried out under conditions permitting oxidation, a portion of the indium, and some of the lead also, is likely to be oxidized. A hydrogen atmosphere is a particularly satisfactory atmosphere in which to conduct the heating operation.

The temperature at which the heating operation is conducted depends largely on the composition of the metal powder layer applied to the backing sheet, but in general should be within the range from about 150° C. to 900° C. Relatively low temperatures of the order of 150° C. are employed if the surface layer consists essentially of lead-indium powder. Relatively high temperatures of the order of 900° C. are employed if the surface layer is composed of a powder mixture containing a substantial amount (50%–75%) of a high melting point metal such as copper. Intermediate temperatures are employed if the powder mixture contains substantial quantities of one or more metals having moderately high melting points, or if it contains a relatively small percentage of a high melting point metal.

The time required for the heating operation is dependent largely on the size of the article. It should be sufficiently long for the surface layer to be brought fully up to the temperature required for bonding of the particles. Ordinarily a heating time of five to ten minutes is sufficient for this purpose, but longer heating times may sometimes be desired.

If the lead-indium powder employed in forming the surface layer is composed of particles of lead having a surface coating of indium, the heating operation will result in diffusion of the surface film of indium into the lead particles. Because of the small dimensions of the powdered particles, the bonded particles after heating may approximate particles of a true lead-indium alloy, especially if the heating operation is continued for a sufficient period of time.

The backing sheet with the lead-indium surface layer thereon is also subjected to an elevated pressure in such manner as to form a dense, compact surface layer of the bonded lead-indium particles. This may be accomplished by passing the sheet after the heating operation through rolls. Generally, however, it is more convenient to employ a press of the coining press type. The press may be arranged so as to exert the required pressure on the surface layer of the article, and at the same time to blank out bearing pieces. Or, if desired, the press may be arranged to serve the triple function of applying the required pressure to the lead-indium surface layer, of blanking out the bearing pieces, and of forming these pieces into half-bearings or other bearing shapes. In any event, the pressure exerted on the lead-indium surface layer should be quite high in order to form a layer of adequate density for bearing purposes. Pressures of the order of 25,000 to 30,000 pounds per square inch usually are sufficient for the production of highly satisfactory bearing surface layers.

Although it is generally most satisfactory to perform the heating operation and the pressing operation as separate steps with heating first and pressing second, it is possible to reverse the order of these operations, or even to conduct them simultaneously in a press designed to operate at the required elevated temperature of the heating operation. Other modifications in the procedure specifically described above will be apparent to those skilled in the art.

I claim:

1. An article comprising a supporting member having thereon a surface layer comprised of finely divided lead-indium particles consisting essentially of lead and indium, said particles being bonded together to form an integral surface layer adherent to the supporting member.

2. An article comprising a supporting member having thereon a surface layer comprised of finely divided particles of an alloy consisting essentially of lead and indium, said particles being bonded together to form an integral surface layer adherent to the supporting member.

3. An article comprising a supporting member having thereon a surface layer comprised of finely divided particles of an alloy consisting essentially of lead and indium, said alloy containing about 0.05% to 10% by weight of indium and the balance lead, and said particles being bonded together to form an integral surface layer adherent to the supporting member.

4. A bearing comprising a supporting member having thereon a bearing surface layer comprised of finely divided lead-indium particles consisting essentially of lead and indium, said particles being bonded together to form an integral bearing surface layer adherent to the supporting member.

5. A bearing comprising a supporting member having thereon a bearing surface layer comprised of finely divided particles of an alloy consisting essentially of lead and indium, said alloy containing 0.05% to 10% by weight of indium and the balance lead, and said particles being bonded together to form an integral bearing surface layer adherent to the supporting member.

6. A bearing comprising a supporting member having thereon a bearing surface layer comprised of finely divided particles of an alloy consisting essentially of lead and indium, said alloy containing 0.2% to 1% by weight of indium and the balance lead, and said particles being bonded together to form an integral bearing surface layer adherent to the supporting member.

WILLIAM S. MURRAY.